(12) United States Patent
Fontes et al.

(10) Patent No.: US 12,410,774 B2
(45) Date of Patent: Sep. 9, 2025

(54) WIND TURBINE CONTROL ARCHITECTURE

(71) Applicant: Siemens Gamesa Renewable Energy A/S, Brande (DK)

(72) Inventors: Paulo Miguel Jesus Fontes, Horsens (DK); Martin Green, Holstebro (DK); Henrik Nissen, Hjerm (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 465 days.

(21) Appl. No.: 17/764,571

(22) PCT Filed: Sep. 22, 2020

(86) PCT No.: PCT/EP2020/076434
§ 371 (c)(1),
(2) Date: Mar. 29, 2022

(87) PCT Pub. No.: WO2021/073840
PCT Pub. Date: Apr. 22, 2021

(65) Prior Publication Data
US 2022/0333576 A1   Oct. 20, 2022

(30) Foreign Application Priority Data

Oct. 16, 2019   (EP) .................................... 19203525

(51) Int. Cl.
*F03D 7/04*   (2006.01)

(52) U.S. Cl.
CPC .......... *F03D 7/047* (2013.01); *F05B 2270/70* (2013.01)

(58) Field of Classification Search
CPC .... F03D 7/047; F05B 2270/70; G06F 15/167; Y02E 10/72
See application file for complete search history.

(56) References Cited

U.S. PATENT DOCUMENTS

| 2004/0230377 | A1* | 11/2004 | Ghosh ..................... F03D 7/048 702/3 |
| 2010/0078939 | A1 | 4/2010 | Kammer et al. |
| 2011/0106325 | A1 | 5/2011 | Yee et al. |
| 2015/0051714 | A1* | 2/2015 | Romanik .............. H04L 67/125 700/89 |
| 2015/0132130 | A1 | 5/2015 | Brown |

(Continued)

FOREIGN PATENT DOCUMENTS

| CN | 101713375 A | 5/2010 |
| CN | 105134493 A | 12/2015 |

(Continued)

OTHER PUBLICATIONS

International Search Report & Written Opinion for PCT/EP2020/076434 issued Jan. 22, 2021.

(Continued)

*Primary Examiner* — Tameem D Siddiquee
(74) *Attorney, Agent, or Firm* — Schmeiser, Olsen & Watts LLP

(57) ABSTRACT

A wind turbine control architectures, including a turbine control portion which is configured to control at least one component of a wind turbine, and a turbine data storage portion which is configured to store a data storage container therein is provided. The turbine control portion and the turbine data storage portion communicate with each other via an inter-process communication.

11 Claims, 2 Drawing Sheets

(56) References Cited

U.S. PATENT DOCUMENTS

| | | | |
|---|---|---|---|
| 2015/0209971 A1 | 7/2015 | Bodivit | |
| 2015/0267686 A1* | 9/2015 | Kjær et al. | F03D 9/255 |
| | | | 290/44 |
| 2016/0026813 A1* | 1/2016 | Neitzel | G06F 21/604 |
| | | | 726/17 |
| 2016/0115942 A1 | 4/2016 | Noto | |
| 2016/0215759 A1 | 7/2016 | Fleming | |
| 2018/0269687 A1* | 9/2018 | Ghaemi | H02J 3/381 |
| 2018/0372069 A1 | 12/2018 | Church | |
| 2020/0380391 A1* | 12/2020 | Allard | G05B 23/0283 |

FOREIGN PATENT DOCUMENTS

| | | | | |
|---|---|---|---|---|
| CN | 205744288 U | | 11/2016 | |
| JP | 2013143545 A | * | 7/2013 | |
| WO | 2013060013 A1 | | 5/2013 | |
| WO | 2013/143545 A1 | | 10/2013 | |
| WO | 2013152776 A1 | | 10/2013 | |
| WO | WO2013143545 | * | 10/2013 | |
| WO | 2014029940 A1 | | 2/2014 | |
| WO | WO2014029440 | * | 2/2014 | |
| WO | WO-2014029440 A1 | * | 2/2014 | F03D 7/047 |
| WO | 2015054878 A1 | | 4/2015 | |
| WO | 2016/066169 A1 | | 5/2016 | |

OTHER PUBLICATIONS

R. Zapata et al: "Multipurpose Synchronised PQ Meters for Isolated Environments", Renewable Energy and Power Quality Journal, vol. 1, No. 01, Apr. 1, 2003.

* cited by examiner

WIND TURBINE CONTROL ARCHITECTURE

CROSS-REFERENCE TO RELATED APPLICATIONS

This application claims priority to PCT Application No. PCT/EP2020/076434, having a filing date of Sep. 22, 2020, which claims priority to EP Application No. 19203525.1, having a filing date of Oct. 16, 2019, the entire contents both of which are hereby incorporated by reference.

FIELD OF TECHNOLOGY

The following relates to a wind turbine control architecture and to a wind turbine comprising such a wind turbine control architecture.

BACKGROUND

FIG. 3 shows a wind turbine control architecture 101 according to the conventional art. The conventional art turbine control architecture 101 consists of two computers, that is a main computer 110 which is responsible for turbine control operations, and an interface computer 120.

The main computer 110 is responsible for collecting data from a wind park using I/O-stations 115, which measure the turbine environment, and controls the necessary electric and mechanic devices for the optimized harvesting of the wind energy. The interface computer 120 uses a protocol converter for a communication between the main computer 110 and remaining systems in the wind park such as a SCADA system. The interface computer 120 also implements a SQL data storage container which stores some of the field values collected by the main computer 110 and makes these logged values available for an offline analysis and troubleshooting.

The interface computer 120 is present in each wind turbine and used to store field data collected by the FO-stations 115 by the main computer 110. The main computer 110 and the interface computer 120 communicate by an ethernet network 113, where the main computer 110 samples the data and sends these values over the ethernet network 115 to the interface computer 120 which stores the data into the SQL data storage container.

Due to the communication via the ethernet network 115 between both computers 110, 120 and a legacy proprietary protocol being used, there is a jitter in the data from when they are sampled until they are logged-in by the interface computer 120. Furthermore, the data can be lost due to an instability in the ethernet network 115.

Both computers 110, 120 inside the wind turbine need to be setup and maintained. Besides the maintenance and initial costs, the wind turbine configuration is complex since the turbine control architecture 101 needs to be configured on the ethernet network 115 and the right set of permissions needs to be setup in both computers 110, 120.

SUMMARY

An aspect relates to a wind turbine control architecture which enables a more reliable turbine control under reduced costs.

According to a first aspect of embodiments of the invention, a wind turbine control architecture comprises a turbine control portion which is configured to control at least one component of a wind turbine, and a turbine data storage portion which is configured to store a data storage container therein. The data storage container is not necessarily a physical container and can comprise a database. The turbine control portion and the turbine data storage portion communicate with each other via an inter-process communication.

The turbine control portion can be responsible for the data acquisition which collects data from the field using external devices such as I/O-stations and provide the values for turbine control operations and to the turbine data storage portion. In the wind turbine control architecture, the data is internally transferred using the inter-process communication so that the external conventional art ethernet network 115 (FIG. 3) or an ethernet interface for the data transfer can be omitted. Furthermore, the data storage functionality is moved to the turbine data storage portion so that the conventional art interface computer can be eliminated. The costs are thus reduced in the investment stage and during the lifetime of the turbine.

In addition, jitter and latency on the stored data can be reduced since the physical machine storing the data is the same which is acquiring the data from the field. With an improved data resolution, the diagnostics can be further improved and real-time analytics from the field data can be realized. The possibility of data loss due to network issues is removed. Higher sampling rates further allow better data resolution and thus better analytics, and preventive maintenances can be avoided.

In an embodiment, the turbine control portion and the turbine data storage portion are integrally formed in a single wind turbine control device, for example a single computer. With the integration of the turbine control portion and the turbine data storage portion in a single computer, the conventional art interface computer 120 (FIG. 3) can be omitted by moving its functionality into the turbine control portion of embodiments of the present invention. In this wind turbine control architecture, the data storage container can be realized by the turbine data storage portion which uses a time-series data storage container design for data storage. As a result, the initial investment, and the cost of maintenance on the wind turbine lifetime are reduced.

Furthermore, by having both the turbine control portion and the turbine data storage portion in the same computer, data loss can be avoided due to network problems or cabling errors. Since the turbine control portion and the turbine data storage portion are in the same computer, bandwidth issues, that are usually a bottleneck in the network, can also be removed since the data does not need to leave the computer.

In an embodiment, the turbine data storage portion is configured to store a time-series data storage container, TSDB. By adding the time-series data storage container to the wind turbine control architecture, it is possible to store operational data in the same computer that is sampling the field data, whereby eliminating latencies in the data samples. The time-series data storage container further offers advantages in a relatively small data space and improved real-time analytics and diagnostics as well as troubleshooting as any event represented by a group of parameters is allocated to a predetermined time.

In an embodiment, the turbine control portion is configured to communicate with at least one external device, for example the I/O-stations in the field.

In an embodiment, the inter-process communication is a local process communication. In an embodiment, the inter-process communication uses a User Datagram Protocol (UDP).

In an embodiment, the turbine control portion and the turbine data storage portion use a shared memory. A shared memory can be a memory that may be simultaneously accessed by multiple programs with an intent to provide communication among them or avoid redundant copies. Shared memory is an efficient passing data between programs. Depending on context, programs may run on a single processor or on multiple separate processors. Using memory for communication inside a single program, e.g., among its multiple threads, is also referred to as shared memory. A plurality of processes can share a certain part of a background memory such as a RAM (Random-Access Memory). For all processes involved, this shared memory area can be located in their address spaces and can be read and changed with normal memory access operations. Since processors of the turbine control portion and the turbine data storage portion can share a single view of data and the communication between their processors is faster as memory accesses to the same location, the shared memory is easy to program. As an alternative to the shared memory concept, a distributed memory and a distributed shared memory concept can also be used.

In an embodiment, the turbine control portion and the turbine data storage portion are connected by a local or internal bus which does not use the ethernet protocol.

In an embodiment, the turbine control portion and the turbine data storage portion are configured to be setup and maintained together. The costs are thus reduced during the setup and during the lifetime of the wind turbine.

In an embodiment, the turbine control portion and the turbine data storage portion are configured to directly interface data of the data storage container, and the turbine control portion is configured to impose rules and guarantees of Quality of Service (QoS) parameters.

According to a second aspect of embodiments of the invention, a wind turbine is provided which comprises the wind turbine control architecture according to any one of the preceding claims.

It must be noted that embodiments of the invention have been described with reference to different subject matters. Some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, between features of the apparatus type claims and features of the method type claims is considered as to be disclosed with this application.

BRIEF DESCRIPTION

Some of the embodiments will be described in detail, with reference to the following figures, wherein like designations denote like members, wherein.

DETAILED DESCRIPTION

Figure 1:
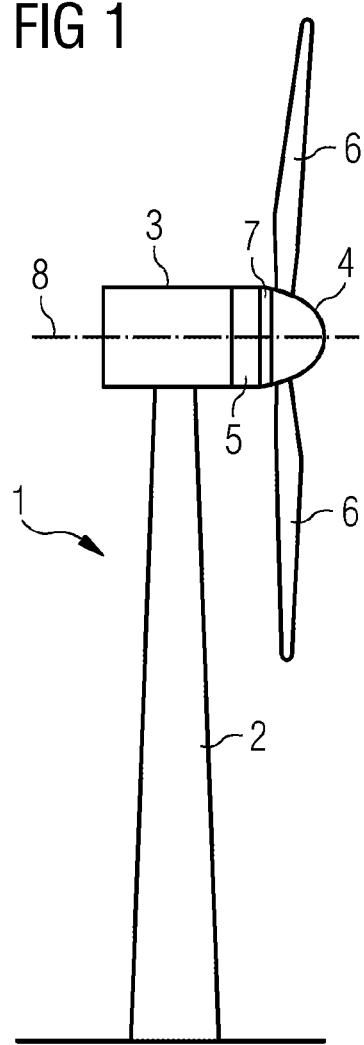
FIG. 1 shows an example of a wind turbine and different elements thereof.

FIG. 1 shows an example of a wind turbine 1. The wind turbine 1 comprises a nacelle 3 and a tower 2. The nacelle 3 is mounted at the top of the tower 2. The nacelle 3 is mounted rotatable with regard to the tower 2 by a yaw bearing. The axis of rotation of the nacelle 3 with regard to the tower 2 is referred to as the yaw axis.

The wind turbine 1 also comprises a hub 4 with three rotor blades 6 (of which two rotor blades 6 are depicted in FIG. 1). The hub 4 is mounted rotatable with regard to the nacelle 3 by a main bearing 7. The hub 4 is mounted rotatable about a rotor axis of rotation 8.

The wind turbine 1 furthermore comprises a generator 5. The generator 5 in turn comprises a rotor 10 connecting the generator 5 with the hub 4. The hub 4 is connected directly to the generator 5, thus the wind turbine 1 is referred to as a gearless, direct-driven wind turbine. Such a generator 5 is referred as direct drive generator 5. As an alternative, the hub 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the hub 4 into electrical energy in the shape of an AC power.

Figure 2:
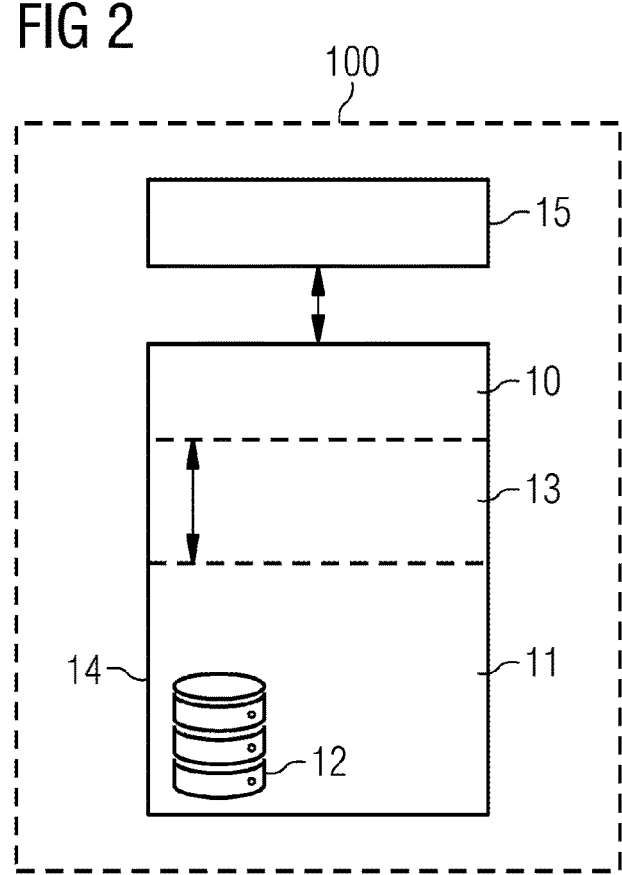
FIG. 2 shows a wind turbine control architecture according to an embodiment of the present invention.

FIG. 2 shows a wind turbine control architecture 100 according to an embodiment of the present invention. The wind turbine control architecture 100 comprises a turbine control portion 10 which is configured to control at least one component of a wind turbine 1. For example, the turbine control portion 10 can be configured to control a pitch angle of the rotor blades 6 and/or an output power of the generator 5; however, embodiments of the present invention are not limited thereto.

The wind turbine control architecture 100 further comprises a turbine data storage portion 11 which is configured to store a data storage container 12 therein. The turbine control portion 10 and the turbine data storage portion 11 communicate with each other via an inter-process communication 13.

Figure 3:
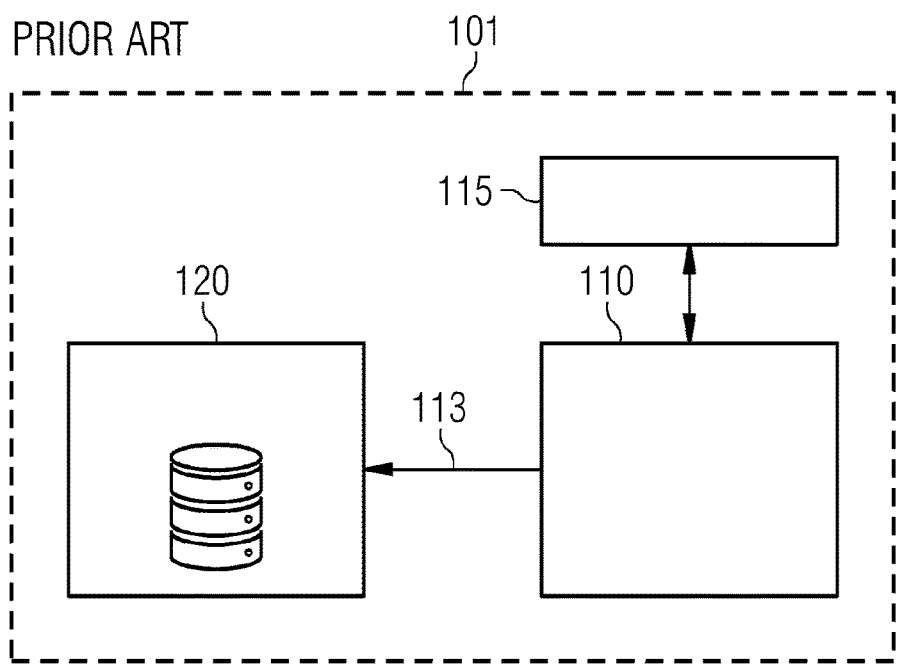
FIG. 3 shows a wind turbine control architecture according to the conventional art.

The turbine control portion 10 can be responsible for the data acquisition which collects data from the field using external devices such as I/O-stations 15 and provide the values for turbine control operations and to the turbine data storage portion 11. In the wind turbine control architecture 100, the data is internally transferred using the inter-process communication 13 so that the external conventional art ethernet network 113 (FIG. 3) for the data transfer can be omitted. Furthermore, the data storage functionality is moved to the turbine control portion 10 so that the conventional art interface computer 120 (FIG. 3) can be eliminated. The costs are thus reduced in the investment stage and during the lifetime of the wind turbine 1.

In addition, jitter and latency on the stored data can be reduced since the physical machine storing the data is the same which is acquiring the data from the field. With an improved data resolution, the diagnostics can be further improved and real-time analytics from the field data can be realized. The possibility of data loss due to network issues is removed. Higher sampling rates further allow better data resolution and thus better analytics, and preventive maintenances can be avoided.

The turbine control portion 10 and the turbine data storage portion 11 are integrally formed in a single wind turbine control device 14. Such a wind turbine control device 14 can be embodied as a computer. With the integration of the turbine control portion 10 and the turbine data storage portion 11 in a single computer, the conventional art interface computer 120 (FIG. 3) can be omitted by moving its functionality into the turbine control portion 10 of embodiments of the present invention. In this wind turbine control architecture 100, the data storage container 12 can be realized by the turbine data storage portion 11 using a time-series data storage container design for data storage. As a result, the initial investment costs and the costs of maintenance during the lifetime of the wind turbine 1 are reduced.

Furthermore, by having both the turbine control portion 10 and the turbine data storage portion 11 in the same computer 14, data loss can be avoided due to network problems or cabling errors. Since the turbine control portion 10 and the turbine data storage portion 11 are in the same computer 14, bandwidth issues, that are usually a bottleneck in a network, can also be removed since the data does not need to leave the computer 14.

The turbine data storage portion 11 is configured to store a time-series data storage container, TSDB 12. By adding the time-series data storage container 12 to the wind turbine control architecture 100, it is possible to store operational data in the same computer 14, that is sampling the field data, whereby eliminating latencies in the data samples. The time-series data storage container 12 further offers advantages in a relatively small data space and improved real-time diagnostics and troubleshooting as any event represented by a group of parameters is allocated to a predetermined time.

The time-series data storage container 12 can be implemented by a SQL database.

The turbine control portion 10 is configured to communicate with at least one external device 15, for example the I/O-stations 15 in the field.

The inter-process communication 13 is a local process communication. In an embodiment, the inter-process communication 13 can use a User Datagram Protocol (commonly abbreviated as UDP).

The turbine control portion 10 and the turbine data storage portion 11 can use a shared memory. A shared memory can be a memory that may be simultaneously accessed by multiple programs with an intent to provide communication among them or avoid redundant copies. Shared memory is an efficient passing data between programs. Depending on context, programs may run on a single processor or on multiple separate processors.

Using memory for communication inside a single program, e.g., among its multiple threads, is also referred to as shared memory. A plurality of processes can share a certain part of a background memory such as a RAM (Random-Access Memory). For all processes involved, this shared memory area can be located in their address spaces and can be read and changed with normal memory access operations. Since processors of the turbine control portion 10 and the turbine data storage portion 11 share a single view of data and the communication between their processors is faster as memory accesses to the same location, the shared memory is easy to program.

As an alternative to the shared memory concept, a distributed memory and a distributed shared memory concept can also be used.

The turbine control portion 10 and the turbine data storage portion 11 are configured to be setup and maintained together. The costs are thus reduced during the setup and during the lifetime of the wind turbine 1.

The turbine control portion 10 and the turbine data storage portion 11 are connected by a local or internal bus (not shown). Such an internal bus can comprise an internal data bus, a memory bus, a system bus or a front-side-Bus. The system bus can comprise an address bus, a control bus and a data bus.

The turbine control portion 10 and the turbine data storage portion 11 are configured to directly interface data of the data storage container 12, and the turbine control portion 10 is configured to impose rules and guarantees of Quality-of-Service (QoS) parameters such as (bit) rate, reliability, packet loss, throughput, transmission delay, availability, jitter and security of data flow.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine control architecture for a wind park, comprising:
   a single wind turbine control device provided with a turbine control device and a turbine data storage device therein;
   wherein the turbine control device is configured to control at least one component of a wind turbine, wherein the turbine control device collects data from the wind park; and
   wherein the turbine data storage device is configured to store a time-series data storage container, TSDB, therein, wherein the time-series data storage container, TSDB, is implemented by a SQL database;
   wherein
   the turbine control device and the turbine data storage device communicate with each other via an inter-process communication, wherein the turbine control device and the turbine data storage device are integrally formed and structurally incorporated within the single wind turbine control device.

2. The wind turbine control architecture according to claim 1, wherein the turbine control device is configured to communicate with at least one external device.

3. The wind turbine control architecture according to claim 1, wherein the inter-process communication is a local process communication.

4. The wind turbine control architecture according to claim 1, wherein the inter-process communication uses a User Datagram Protocol.

5. The wind turbine control architecture according to claim 1, wherein the turbine control device and the turbine data storage device use a shared memory, and wherein the turbine control device and the turbine data storage device share a portion of background memory.

6. The wind turbine control architecture according to claim 1, wherein the turbine control device and the turbine data storage device are connected by a local or internal bus.

7. The wind turbine control architecture according to claim 1, wherein the turbine control device and the turbine data storage device are configured to be setup and maintained together.

8. The wind turbine control architecture according to claim 1, wherein the turbine control device and the turbine data storage device are configured to directly interface data of the time-series data storage container, TSDB; and the turbine control device is configured to impose rules and guarantees of Quality of Service, QoS, parameters.

9. A wind turbine comprising the wind turbine control architecture according to claim 1.

10. The wind turbine control architecture according to claim 1, wherein the turbine control device is configured to control at least two components of a wind turbine.

11. The wind turbine control architecture according to claim 1, wherein the time-series data storage container, TSDB, comprises a physical container.

* * * * *